US012198591B2

(12) United States Patent
You et al.

(10) Patent No.: US 12,198,591 B2
(45) Date of Patent: Jan. 14, 2025

(54) DISPLAY EFFECT ENHANCEMENT METHOD, APPARATUS, AND DEVICE

(71) Applicants: WUHAN JINGCE ELECTRONIC GROUP CO., LTD, Wuhan (CN); WUHAN JINGLI ELECTRONIC TECHNOLOGY CO., LTD, Wuhan (CN)

(72) Inventors: Jianchao You, Wuhan (CN); Dingde Peng, Hubei (CN)

(73) Assignees: Wuhan Jingce Electronic Group Co., LTD, Wuhan (CN); Wuhan Jingli Electronic Technology Co., LTD, Wuhan (CN)

( * ) Notice: Subject to any disclaimer, the term of this patent is extended or adjusted under 35 U.S.C. 154(b) by 0 days.

(21) Appl. No.: 17/998,197

(22) PCT Filed: Mar. 18, 2021

(86) PCT No.: PCT/CN2021/081504

§ 371 (c)(1),
(2) Date: Nov. 8, 2022

(87) PCT Pub. No.: WO2022/077859

PCT Pub. Date: Apr. 21, 2022

(65) Prior Publication Data

US 2023/0237946 A1 Jul. 27, 2023

(30) Foreign Application Priority Data

Oct. 12, 2020 (CN) ......................... 202011084221.3

(51) Int. Cl.
*G09G 3/20* (2006.01)

(52) U.S. Cl.
CPC ....... *G09G 3/20* (2013.01); *G09G 2320/0233* (2013.01); *G09G 2320/0693* (2013.01)

(58) Field of Classification Search
None
See application file for complete search history.

(56) References Cited

U.S. PATENT DOCUMENTS 10,032,406 B2 7/2018 Peng
2018/0082627 A1 3/2018 Deng
(Continued)

FOREIGN PATENT DOCUMENTS

CN 105741763 A 7/2016
CN 109036266 A 12/2018
(Continued)

OTHER PUBLICATIONS

China National Intellectual Property Administration, International Search Report for PCT App. No. PCT/CN2021/081504, Jul. 2, 2021, pp. 1-4.

(Continued)

*Primary Examiner* — Amr A Awad
*Assistant Examiner* — Donna V Bocar
(74) *Attorney, Agent, or Firm* — CAHN & SAMUELS, LLP

(57) ABSTRACT

The present invention provides a display effect enhancement method, apparatus, and device. The apparatus includes: an obtaining module configured to obtain a grayscale value of each pixel of a picture to be displayed; a first demura module located in a main control chip and configured to perform, according to the grayscale value of each pixel, a first brightness compensation on the picture to be displayed; a second demura module located in a driving chip and configured to perform a second brightness compensation on the picture to be displayed that has been subjected to the first brightness compensation; and a display module configured to display the picture to be displayed that has been subjected to the second brightness compensation. According to the (Continued)

present invention, in consideration of the fact that the main control chip includes the first demura module, two times of demura are performed, on the basis of the first demura module of the main control chip and the second demura module of the driving chip, on a grayscale image having a display effect to be enhanced, thus effectively improving a display effect of a display panel for a picture.

11 Claims, 3 Drawing Sheets

(56) References Cited

U.S. PATENT DOCUMENTS

| | | | | |
|---|---|---|---|---|
| 2018/0357945 | A1 | 12/2018 | Tang et al. | |
| 2021/0134246 | A1* | 5/2021 | Li | G09G 3/3275 |
| 2021/0150965 | A1* | 5/2021 | Zhang | G09G 3/3208 |

FOREIGN PATENT DOCUMENTS

| | | | |
|---|---|---|---|
| CN | 111028809 | A | 4/2020 |
| CN | 111710277 | A | 9/2020 |
| CN | 111933074 | A | 11/2020 |

OTHER PUBLICATIONS

China National Intellectual Property Administration, Written Opinion for PCT App. No. PCT/CN2021/081504, Jul. 2, 2021, pp. 1-4.

European Patent Office, English abstract for CN105741763A, printed on Nov. 8, 2022.

European Patent Office, English abstract for CN109036266A, printed on Nov. 8, 2022.

European Patent Office, English abstract for CN111028809A, printed on Nov. 8, 2022.

European Patent Office, English abstract for CN111710277A, printed on Nov. 8, 2022.

European Patent Office, English abstract for CN111933074A, printed on Nov. 8, 2022.

* cited by examiner

DISPLAY EFFECT ENHANCEMENT METHOD, APPARATUS, AND DEVICE

FIELD OF THE INVENTION

The present invention relates to the technical field of image processing, and in particular to a display effect enhancement method, apparatus, and device.

BACKGROUND OF THE INVENTION

At present, in order to ensure the display effect of the display panel, after the gamma debugging is performed on the display panel, it is necessary to further perform demura processing on the display panel, wherein the demura processing on the display panel is generally completed based on the driving chip.

However, after the demura processing is completed, the display panel is shipped to the whole machine factory. If the effect of the demura processing is not good, it is often difficult for the whole machine factory to debug the display panel again. Even if the display panel can be debugged, it is limited by the capability and cooperation of the driving chip. That is to say, it is impossible to solve the problem that the effect of the demura processing is not good enough, so that the display effect of the display panel is not good enough to flow into the consumer market.

SUMMARY OF THE INVENTION

The main purpose of the present invention is to provide a display effect enhancement method, apparatus, and device, aiming to solve the problem that the effect of the demura processing is not good in the prior art.

In a first aspect, the present invention provides a display effect enhancement apparatus, comprising:

- an obtaining module, which is configured to obtain a grayscale value of each pixel of a picture to be displayed;
- a first demura module, which is located in a main control chip and configured to perform a first brightness compensation on the picture to be displayed according to the grayscale value of each pixel;
- a second demura module, which is located in a driving chip and configured to perform a second brightness compensation on the picture to be displayed that has been subjected to the first brightness compensation; and
- a display module, which is configured to display the picture to be displayed that has been subjected to the second brightness compensation.

Optionally, the first demura module is specifically configured to:

- determine a target pixel and a non-target pixel in the picture to be displayed according to the grayscale value of each pixel and a preset rule;
- perform brightness compensation on the target pixel based on a brightness compensation value corresponding to the target pixel, and perform brightness compensation on the non-target pixel based on a brightness compensation value corresponding to the non-target pixel, wherein the brightness compensation value corresponding to the target pixel is non-zero, and the brightness compensation value corresponding to the non-target pixel is zero; and
- determine the preset rule according to the compensation effect when the first demura module and the second demura module are turned on at the same time and the compensation effect when only the second demura module is turned on.

Optionally, the display effect enhancement apparatus further comprises a rule determination module, which is configured to:

- use the second demura module to perform demura on a plurality of grayscale pictures or a picture comprising a plurality of grayscales so as to obtain a first demura image comprising the plurality of the grayscales;
- use the first demura module to perform demura on the first demura image again so as to obtain a second demura image comprising the plurality of the grayscales; and
- determine with the preset rule that the pixel corresponding to the grayscale is the target pixel if a display effect of the second demura image is better than that of the first demura image under the same grayscale, otherwise, the pixel corresponding to the grayscale is the non-target pixel (if the condition is not met).

In a second aspect, the present invention further provides a display effect enhancement method, comprising the following steps:

- obtaining a grayscale value of each pixel of a picture to be displayed;
- performing a first brightness compensation on the picture to be displayed according to the grayscale value of each pixel through a first demura module in a main control chip;
- performing a second brightness compensation on the picture to be displayed that has been subjected to the first brightness compensation through a second demura module in a driving chip; and
- displaying the picture to be displayed that has been subjected to the second brightness compensation.

Optionally, the steps of performing a first brightness compensation on the picture to be displayed according to the grayscale value of each pixel comprise:

- determining a target pixel and a non-target pixel in the picture to be displayed according to the grayscale value of each pixel and a preset rule;
- performing brightness compensation on the target pixel based on a brightness compensation value corresponding to the target pixel, and performing brightness compensation on the non-target pixel based on a brightness compensation value corresponding to the non-target pixel, wherein the brightness compensation value corresponding to the target pixel is non-zero, and the brightness compensation value corresponding to the non-target pixel is 0; and
- determining the preset rule according to the compensation effect when the first demura module and the second demura module are turned on at the same time and the compensation effect when only the second demura module is turned on.

Optionally, the steps of determining the preset rule comprise:

- using the second demura module to perform demura on a plurality of grayscale pictures or a picture comprising a plurality of grayscales so as to obtain a first demura image comprising the plurality of the grayscales;
- using the first demura module to perform demura on the first demura image again so as to obtain a second demura image comprising the plurality of the grayscales; and
- determining with the preset rule that the pixel corresponding to the grayscale is the target pixel if a display effect of the second demura image is better than that of the first demura image under the same grayscale, otherwise, the pixel corresponding to the grayscale is the non-target pixel (if the condition is not met).

In a third aspect, the present invention further provides a display effect enhancement apparatus, comprising:

an obtaining module, which is configured to obtain a grayscale value of each pixel of a picture to be displayed;

a first demura module, which is located in a main control chip;

a second demura module, which is located in a driving chip;

a judgment module, which is configured to judge whether to turn on the first demura module according to the grayscale value of each pixel and a preset rule, and perform brightness compensation on the picture to be displayed based on a judgment value, wherein the preset rule is determined according to the compensation effect when the first demura module and the second demura module are turned on at the same time and the compensation effect when only the second demura module is turned on; and a display module, which is configured to display the picture to be displayed that has been subjected to the brightness compensation.

Optionally, the judgement module is specifically configured to:

determine a target pixel and a non-target pixel in the picture to be displayed according to the grayscale value of each pixel and a preset rule;

turn on the first demura module and the second demura module and perform a second brightness compensation on the target pixel; and turn off the first demura module, turn on the second demura module and perform a first brightness compensation on the non-target pixel.

Optionally, the display effect enhancement apparatus further comprises a rule determination module, which is configured to:

use the second demura module to perform demura on a plurality of grayscale pictures or a picture comprising a plurality of grayscales so as to obtain a first demura image comprising the plurality of the grayscales;

use the first demura module to perform demura on the first demura image again so as to obtain a second demura image comprising the plurality of the grayscales; and determine with the preset rule that the pixel corresponding to the grayscale is the target pixel if a display effect of the second demura image is better than that of the first demura image under the same grayscale, otherwise, the pixel corresponding to the grayscale is the non-target pixel (if the condition is not met).

In a fourth aspect, the present invention further provides a display effect enhancement method, comprising the following steps:

obtaining a grayscale value of each pixel of a picture to be displayed;

judging whether to turn on a first demura module according to the grayscale value of each pixel and a preset rule, and performing brightness compensation on the picture to be displayed based on a judgment value, wherein the preset rule is determined according to the compensation effect when the first demura module and a second demura module are turned on at the same time and the compensation effect when only the second demura module is turned on, the first demura module is located in a main control chip, and the second demura module is located in a driving chip; and displaying the picture to be displayed that has been subjected to the brightness compensation.

Optionally, the steps of judging whether to turn on a first demura module according to the grayscale value of each pixel and a preset rule, and performing brightness compensation on the picture to be displayed based on a judgment value comprise:

determining a target pixel and a non-target pixel in the picture to be displayed according to the grayscale value of each pixel and a preset rule;

turning on the first demura module and the second demura module and performing a second brightness compensation on the target pixel; and turning off the first demura module, turning on the second demura module and performing a first brightness compensation on the non-target pixel.

Optionally, the steps of determining the preset rule comprise:

using the second demura module to perform demura on a plurality of grayscale pictures or a picture comprising a plurality of grayscales so as to obtain a first demura image comprising the plurality of the grayscales;

using the first demura module to perform demura on the first demura image again so as to obtain a second demura image comprising the plurality of the grayscales; and determining with the preset rule that the pixel corresponding to the grayscale is the target pixel if a display effect of the second demura image is better than that of the first demura image under the same grayscale, otherwise, the pixel corresponding to the grayscale is the non-target pixel (if the condition is not met).

In a fifth aspect, the present invention further provides a display effect enhancement device, comprising a processor, a memory, and a display effect enhancement program stored on the memory and executable by the processor, wherein when the display effect enhancement program is executed by the processor, the steps of the above-mentioned display effect enhancement method are realized.

In the present invention, a grayscale value of each pixel of a picture to be displayed is obtained; a first brightness compensation is performed on the picture to be displayed according to the grayscale value of each pixel through a first demura module in a main control chip; a second brightness compensation is performed on the picture to be displayed that has been subjected to the first brightness compensation through a second demura module in a driving chip; and the picture to be displayed that has been subjected to the second brightness compensation is displayed. According to the present invention, in consideration of the fact that the main control chip is also provided with a demura module, on the basis of the demura module of the main control chip and the demura module of the driving chip, two times of demura are performed on a grayscale picture having a display effect to be enhanced, thus effectively improving a display effect of a display panel for a picture.

The realization of purposes, functional characteristics and advantages of the present invention will be further described with reference to the drawings in combination with the embodiments.

DETAILED DESCRIPTION OF THE EMBODIMENTS

It should be understood that the specific embodiments described herein are only for explaining the present invention and are not intended to limit the present invention.

In a first aspect, an embodiment of the present invention provides a display effect enhancement device.

Figure 1:
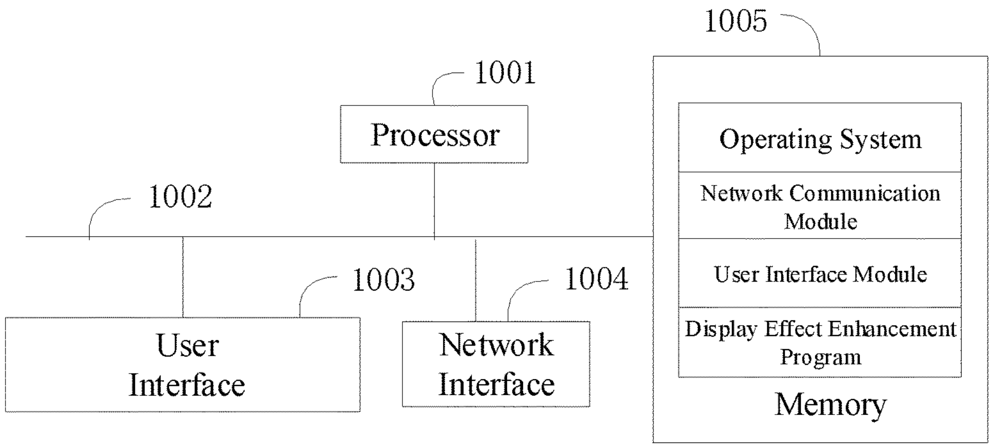
FIG. 1 is a hardware structure diagram of a display effect enhancement device involved in the embodiment of the present invention.

Referring to FIG. 1, FIG. 1 is a hardware structure diagram of a display effect enhancement device involved in an embodiment of the present invention. In this embodiment of the present invention, the display effect enhancement device can comprise a processor 1001 (for example, a central processing unit (CPU)), a communication bus 1002, a user interface 1003, a network interface 1004, and a memory 1005. The communication bus 1002 is configured to realize the connection communication between these components. The user interface 1003 can comprise a display and an input unit such as a keyboard. The network interface 1004 can optionally comprise a standard wired interface and a wireless interface (such as a wireless-fidelity (WI-FI) interface). The memory 1005 can be a high-speed random access memory (RAM) or a non-volatile memory, such as a disk memory. The memory 1005 can optionally further be a storage device independent of the aforementioned processor 1001. Those skilled in the art can understand that the hardware structure shown in FIG. 1 does not constitute a limitation of the present invention, and can comprise more or less components than those shown in FIG. 1, or combine some components, or arrange different components.

Continuing to refer to FIG. 1, the memory 1005 as a computer storage medium in FIG. 1 can comprise an operating system, a network communication module, a user interface module, and a display effect enhancement program. The processor 1001 can call the display effect enhancement program stored in the memory 1005, and execute the display effect enhancement method provided by the embodiment of the present invention.

In a second aspect, an embodiment of the present invention provides a display effect enhancement method.

Figure 2:
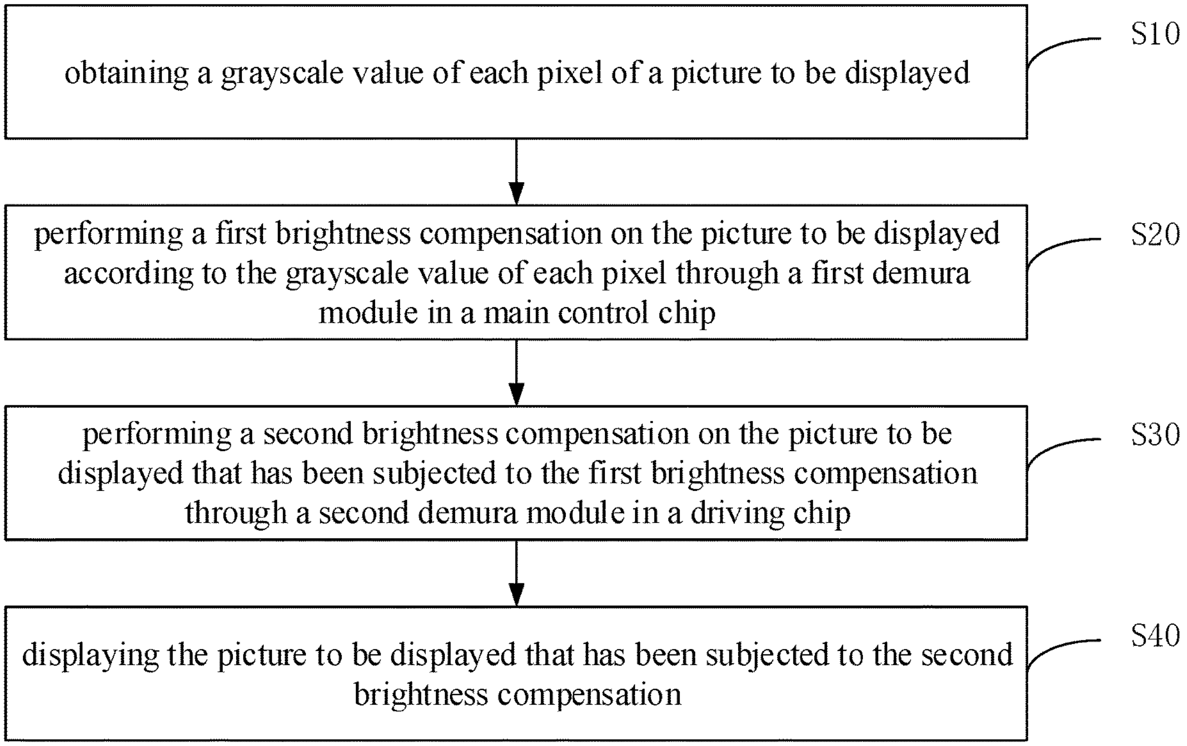
FIG. 2 is a flowchart of an embodiment of a display effect enhancement method in the present invention.

Referring to FIG. 2, FIG. 2 is a flowchart of an embodiment of a display effect enhancement method in the present invention. In one embodiment, the display effect enhancement method comprises the following steps.

S10: A grayscale value of each pixel of a picture to be displayed is obtained.

In this embodiment, the grayscale value of each pixel of the picture to be displayed can be obtained based on an existing image correlation algorithm, which is the prior art and will not be repeated herein.

S20: A first brightness compensation is performed on the picture to be displayed according to the grayscale value of each pixel through a first demura module in a main control chip.

In this embodiment, compensation values corresponding to different colors and different grayscales are formed after the operational processing of the first demura module in the main control chip. On this basis, the first brightness compensation can be performed on the picture to be displayed based on the compensation value corresponding to the grayscale value of each pixel. For the grayscales that do not need to be compensated by the first demura module, the corresponding compensation value thereof is set to 0.

Further, in an embodiment, S20 comprises the following steps.

A target pixel and a non-target pixel in the picture to be displayed are determined according to the grayscale value of each pixel and a preset rule. Brightness compensation is performed on the target pixel based on a brightness compensation value corresponding to the target pixel, and brightness compensation is performed on the non-target pixel based on a brightness compensation value corresponding to the non-target pixel. The brightness compensation value corresponding to the target pixel is non-zero, and the brightness compensation value corresponding to the non-target pixel is zero. The preset rule is determined according to the compensation effect when the first demura module and the second demura module are turned on at the same time and the compensation effect when only the second demura module is turned on.

In this embodiment, for a grayscale picture, the compensation effect when only the second demura module in the driving chip is turned on can be better than the compensation effect when the first demura module and the second demura module are turned on simultaneously. Then, for the grayscale corresponding to the grayscale picture, it only needs to be compensated by the second demura module. That is, the preset rule, which is determined according to the compensation effect when the first demura module and the second demura module are turned on at the same time and the compensation effect when only the second demura module is turned on, specifies which grayscales do not need to be compensated by the first demura module.

On this basis, a target pixel and a non-target pixel in the picture to be displayed can be determined according to the grayscale value of each pixel and the preset rule. The target pixel needs to be compensated by the first demura module, and the non-target pixel does not need to be compensated by the first demura module. The compensation values corresponding to different colors and different grayscales can be formed after the operational processing of the first demura module in the main control chip. On this basis, based on the color and grayscale of the target pixel, the compensation can be performed on the target pixel corresponding to the brightness compensation value; and for the non-target pixel, 0 is taken as the brightness compensation value and compensated.

In one embodiment, the steps of determining the preset rule comprise:

Using the second demura module to perform demura on a plurality of grayscale pictures or a picture comprising a plurality of grayscales so as to obtain a first demura image comprising the plurality of the grayscales; using the first demura module to perform demura on the first demura image again so as to obtain a second demura image comprising the plurality of the grayscales; and determining with the preset rule that the pixel corresponding to the grayscale is the target pixel if a display effect of the second demura image is better than that of the first demura image under the same grayscale, otherwise, as the pixel corresponding to the grayscale is the non-target pixel (if the condition is not met).

In this embodiment, the second demura module can be used to perform demura on a plurality of grayscale pictures respectively, or the second demura module can be used to perform demura on a picture comprising a plurality of grayscales, so as to obtain a first demura image comprising the plurality of the grayscale pictures, and then the first demura module is used to perform demura on the first demura image again. If the display effect of the corresponding second demura image is better than that of the first demura image under the same grayscale, it is determined that the pixel corresponding to the grayscale needs to be compensated by the first demura module. If the display effect of the first demura image is better than that of the second demura image under the same grayscale, it is determined that the pixel corresponding to the grayscale does not need to be compensated by the first demura module. In this way, it can be determined that the pixel corresponding to the grayscale that needs to be compensated by the first demura module is the target pixel, and the pixel corresponding to the grayscale that does not need to be compensated by the first demura module is the preset rule of the non-target pixel. The quality of the display effect can be determined based on method of optical detection technology or human eye recognition.

S30: A second brightness compensation is performed on the picture to be displayed that has been subjected to the first brightness compensation through a second demura module in a driving chip.

In this embodiment, after the operational processing of the second demura module in the driving chip, the brightness compensation values corresponding to different colors and different grayscales are obtained. On this basis, based on the color and grayscale of each pixel of the picture to be displayed that has been subjected to the first brightness compensation, the brightness compensation value corresponding to each pixel of the picture to be displayed that has been subjected to the first brightness compensation is obtained, so as to perform compensation on each pixel based on the brightness compensation value corresponding to each pixel, that is, the second brightness compensation is performed on the picture to be displayed that has been subjected to the first brightness compensation.

S40: The picture to be displayed that has been subjected to the second brightness compensation is displayed.

In this embodiment, after the second brightness compensation is completed, the picture to be displayed has been subjected to the second brightness compensation is displayed.

In the present invention, a grayscale value of each pixel of a picture to be displayed is obtained; a first brightness compensation is performed on the picture to be displayed according to the grayscale value of each pixel through a first demura module in a main control chip; a second brightness compensation is performed on the picture to be displayed that has been subjected to the first brightness compensation through a second demura module in a driving chip; and the picture to be displayed that has been subjected to the second brightness compensation is displayed. According to this embodiment, in consideration of the fact that the main control chip is also provided with a demura module, on the basis of the demura module of the main control chip and the demura module of the driving chip, two times of demura are performed on a grayscale picture having a display effect to be enhanced, thus effectively improving a display effect of a display panel for a picture.

In a third aspect, an embodiment of the present invention provides a display effect enhancement apparatus.

Figure 3:
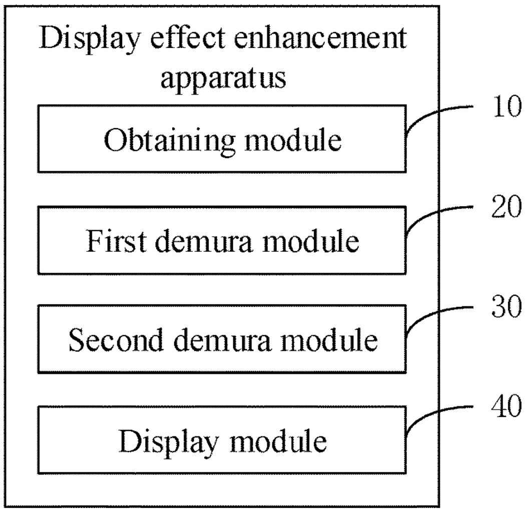
FIG. 3 is a schematic diagram of a functional module of an embodiment of a display effect enhancement apparatus in the present invention.

Referring to FIG. 3, FIG. 3 is a schematic diagram of a functional module of an embodiment of a display effect enhancement apparatus in the present invention. As shown in FIG. 3, the display effect enhancement apparatus comprises:

an obtaining module 10, which is configured to obtain a grayscale value of each pixel of a picture to be displayed;

a first demura module 20, which is located in a main control chip and configured to perform a first brightness compensation on the picture to be displayed according to the grayscale value of each pixel;

a second demura module 30, which is located in a driving chip and configured to perform a second brightness compensation on the picture to be displayed that has been subjected to the first brightness compensation; and a display module 40, which is configured to display the picture to be displayed that has been subjected to the second brightness compensation.

Further, in one embodiment, the first demura module 20 is specifically configured to:

determine a target pixel and a non-target pixel in the picture to be displayed according to the grayscale value of each pixel and a preset rule;

perform brightness compensation on the target pixel based on a brightness compensation value corresponding to the target pixel, and perform brightness compensation on the non-target pixel based on a brightness compensation value corresponding to the non-target pixel, wherein the brightness compensation value corresponding to the target pixel is non-zero, and the brightness compensation value corresponding to the non-target pixel is zero; and determine the preset rule according to the compensation effect when the first demura module and the second demura module are turned on at the same time and the compensation effect when only the second demura module is turned on.

Further, in one embodiment, the display effect enhancement apparatus further comprises a rule determination module, which is configured to:

use the second demura module to perform demura on a plurality of grayscale pictures or a picture comprising a plurality of grayscales so as to obtain a first demura image comprising the plurality of the grayscales;

use the first demura module to perform demura on the first demura image again so as to obtain a second demura image comprising the plurality of the grayscales; and determine with the preset rule that the pixel corresponding to the grayscale is the target pixel if a display effect of the second demura image is better than that of the first demura image under the same grayscale, otherwise, the pixel corresponding to the grayscale is the non-target pixel (if the condition is not met).

It is easy to understand that the function realization of each module in the above display effect enhancement apparatus corresponds to each step in each embodiment of the second aspect, and the functions and implementation process thereof will not be repeated herein.

In a fourth aspect, an embodiment of the present invention further provides a display effect enhancement method.

Figure 4:
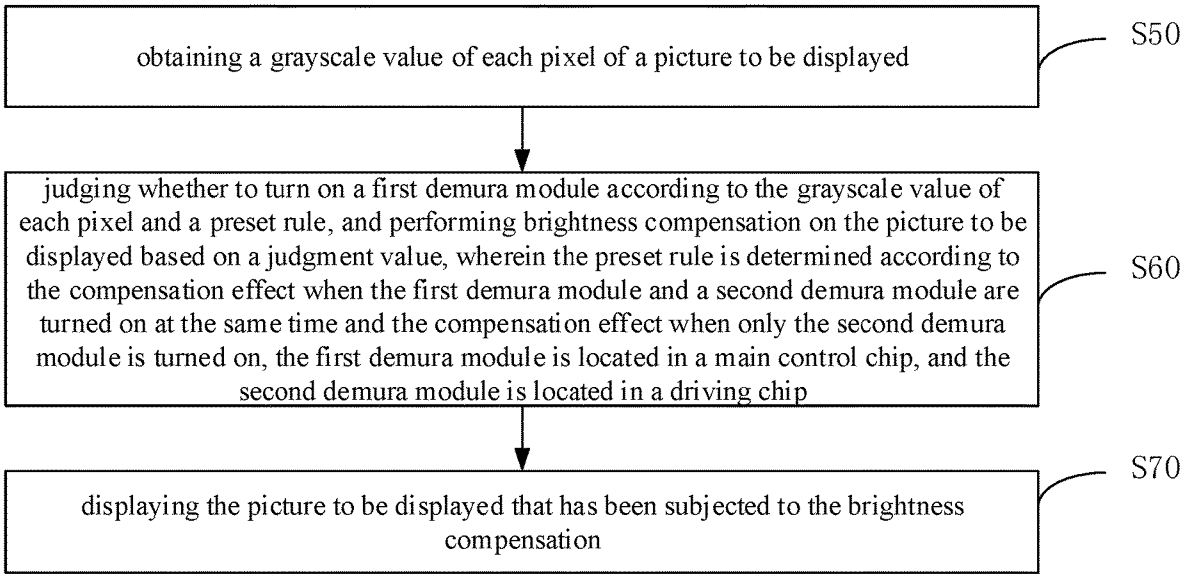
FIG. 4 is a flowchart of another embodiment of a display effect enhancement method in the present invention.

Referring to FIG. 4, FIG. 4 is a flowchart of another embodiment of a display effect enhancement method in the present invention. As shown in FIG. 4, the display effect enhancement method comprises the following steps.

S50: A grayscale value of each pixel of a picture to be displayed is obtained.

In this embodiment, the grayscale value of each pixel of the picture to be displayed can be obtained based on an existing image correlation algorithm, which is the prior art and will not be repeated herein.

S60: Whether to turn on a first demura module is judged according to the grayscale value of each pixel and a preset rule, and brightness compensation is performed on the picture to be displayed based on the judgment value. The preset rule is determined according to the compensation effect when the first demura module and a second demura module are turned on at the same time and the compensation effect when only the second demura module is turned on, the first demura module is located in a main control chip, and the second demura module is located in a driving chip.

In this embodiment, for each pixel in the picture to be displayed, the second demura module is kept on. For each pixel in the picture to be displayed, whether the first demura module is turned on or not needs to be judged according to the grayscale value of the pixel and the preset rule. The preset rule is determined according to the compensation effect when the first demura module and the second demura module are turned on at the same time and the compensation effect when only the second demura module is turned on.

Further, in one embodiment, the steps of judging whether to turn on a first demura module according to the grayscale value of each pixel and a preset rule, and performing brightness compensation on the picture to be displayed based on a judgment value comprise:

determining a target pixel and a non-target pixel in the picture to be displayed according to the grayscale value of each pixel and a preset rule; turning on the first demura module and the second demura module and performing a second brightness compensation on the target pixel; and turning off the first demura module, turning on the second demura module and performing a first brightness compensation on the non-target pixel.

In this embodiment, a target pixel and a non-target pixel in the picture to be displayed can be determined according to the grayscale value of each pixel and the preset rule. For the target pixel, the first demura module and the second demura module are turned on and the second brightness compensation is performed on the target pixel. For the non-target pixel, the first demura module is turned off, the second demura module is turned on, and the first brightness compensation is performed on the non-target pixel.

Further, in one embodiment, the steps of determining the preset rule comprise:

using the second demura module to perform demura on a plurality of grayscale pictures or a picture comprising a plurality of grayscales so as to obtain a first demura image comprising the plurality of the grayscales; using the first demura module to perform demura on the first demura image again so as to obtain a second demura image comprising the plurality of the grayscales; and determining with the preset rule that the pixel corresponding to the grayscale is the target pixel if a display effect of the second demura image is better than that of the first demura image under the same grayscale, otherwise, the pixel corresponding to the grayscale is the non-target pixel (if the condition is not met).

In this embodiment, the second demura module can be used to perform demura on a plurality of grayscale pictures respectively, or the second demura module can be used to perform demura on a picture comprising a plurality of grayscales, so as to obtain a first demura image comprising the plurality of the grayscale pictures, and then the first demura module is used to perform demura on the first demura image again. If the display effect of the corresponding second demura image is better than that of the first demura image under the same grayscale, it is determined that the pixel corresponding to the grayscale needs to be compensated by the first demura module. If the display effect of the first demura image is better than that of the second demura image under the same grayscale, it is determined that the pixel corresponding to the grayscale does not need to be compensated by the first demura module. In this way, it can be determined that the pixel corresponding to the grayscale that needs to be compensated by the first demura module is the target pixel, and the pixel corresponding to the grayscale that does not need to be compensated by the first demura module is the preset rule of the non-target pixel. The quality of the display effect can be determined based on method of optical detection technology or human eye recognition.

S70: The picture to be displayed that has been subjected to the brightness compensation is displayed.

In this embodiment, after the brightness compensation is performed on the picture to be displayed, the picture after compensation is displayed.

In the present invention, a grayscale value of each pixel of a picture to be displayed is obtained, whether to turn on a first demura module is judged according to the grayscale value of each pixel and a preset rule, and brightness compensation is performed on the picture to be displayed based on a judgment value. The preset rule is determined according to the compensation effect when the first demura module and a second demura module are turned on at the same time and the compensation effect when only the second demura module is turned on, the first demura module is located in a main control chip, and the second demura module is located in a driving chip. The picture to be displayed that has been subjected to the brightness compensation is displayed. Through this embodiment, in consideration of the fact that the main control chip is also provided with a demura module, when the compensation is performed on the picture to be displayed, the demura module of the main control chip is selectively turned on or off, so as to improve the display effect of the display panel on the picture.

In a fifth aspect, an embodiment of the present invention further provides a display effect enhancement apparatus.

Figure 5:
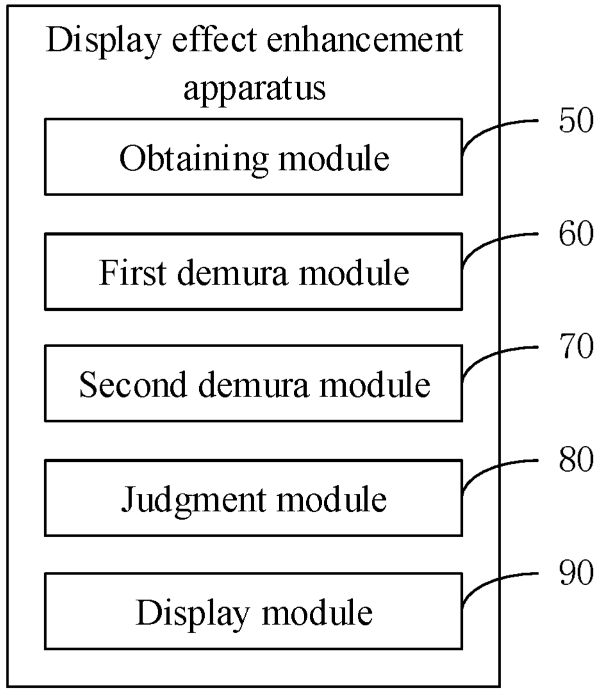
FIG. 5 is a schematic diagram of a functional module of another embodiment of a display effect enhancement apparatus in the present invention.

Referring to FIG. 5, FIG. 5 is a schematic diagram of a functional module of another embodiment of a display effect enhancement apparatus in the present invention. As shown in FIG. 5, the display effect enhancement apparatus comprises:

an obtaining module 50, which is configured to obtain a grayscale value of each pixel of a picture to be displayed;

a first demura module 60, which is located in a main control chip;

a second demura module 70, which is located in a driving chip;

a judgment module 80, which is configured to judge whether to turn on the first demura module according to the grayscale value of each pixel and a preset rule, and perform brightness compensation on the picture to be displayed based on a judgment value, wherein the preset rule is determined according to the compensation effect when the first demura module and the second demura module are turned on at the same time and the compensation effect when only the second demura module is turned on; and a display module 90, which is configured to display the picture to be displayed that has been subjected to the brightness compensation.

Further, in one embodiment, the judgement module 80 is specifically configured to:

determine a target pixel and a non-target pixel in the picture to be displayed according to the grayscale value of each pixel and a preset rule;

turn on the first demura module and the second demura module and perform a second brightness compensation on the target pixel; and turn off the first demura module, turn on the second demura module and perform a first brightness compensation on the non-target pixel.

Further, in one embodiment, the display effect enhancement apparatus further comprises a rule determination module, which is configured to:

use the second demura module to perform demura on a plurality of grayscale pictures or a picture comprising a plurality of grayscales so as to obtain a first demura image comprising the plurality of the grayscales;

use the first demura module to perform demura on the first demura image again so as to obtain a second demura image comprising the plurality of the grayscales; and determine with the preset rule that the pixel corresponding to the grayscale is the target pixel if a display effect of the second demura image is better than that of the first demura image under the same grayscale, otherwise, the pixel corresponding to the grayscale is the non-target pixel (if the condition is not met).

It is easy to understand that the function realization of each module in the above display effect enhancement apparatus corresponds to each step in each embodiment of the fourth aspect, and the functions and implementation process thereof will not be repeated herein.

Moreover, the terms "include", "comprise" or any other variants thereof are intended to cover non-exclusive inclusion, so that a process, method, article or device comprising a series of elements not only comprises those elements, but also comprises those that are not explicitly listed, or further comprises elements inherent to the process, method, article, or device. If there are no more restrictions, the elements defined by the sentence "comprising a . . . " does not exclude the existence of other same elements in the process, method, article, or device comprising the elements.

The above-mentioned serial numbers in the embodiments of the present invention are only for description, and do not represent the advantages or disadvantages of the embodiments.

From the description of the above embodiments, those skilled in the art can clearly understand that the methods of the above embodiments can be implemented by means of software plus a necessary general hardware platform, and of course hardware can also be used, but in many cases the former is better implementation. Based on this understanding, the technical solutions of the present invention, in essence, or the parts that make contributions to the prior art, can be embodied in the form of software products. The computer software products are stored in a storage medium (such as ROM/RAM, magnetic disk, optical disk) as described above, comprising several instructions to make a terminal device execute the methods described in each embodiment of the present invention.

The above are only preferred embodiments of the present invention, and are not intended to limit the protection scope of the present invention. Any equivalent structure or equivalent process transformation made by using the contents of the description and drawings of the present invention, or directly or indirectly applied in other related technical fields, are similarly included in the protection scope of patent of the present invention.

The invention claimed is:

1. A display effect enhancement apparatus comprising:

a first demura module located in a main control chip and configured to perform a first brightness compensation on a picture to be displayed according to a grayscale value of each pixel of the picture;

a second demura module located in a driving chip and configured to perform a second brightness compensation on the picture to be displayed that has been subjected to the first brightness compensation; and a display module configured to display the picture to be displayed that has been subjected to the second brightness compensation;

wherein the first demura module is configured to:

determine a target pixel and a non-target pixel in the picture to be displayed according to the grayscale value of each pixel and a preset rule;

perform brightness compensation on the target pixel based on a brightness compensation value corresponding to the target pixel, and perform brightness compensation on the non-target pixel based on a brightness compensation value corresponding to the non-target pixel, wherein the brightness compensation value corresponding to the target pixel is non-zero, and the brightness compensation value corresponding to the non-target pixel is zero; and determine the preset rule according to a first compensation effect when the first demura module and the second demura module are turned on at the same time and a second compensation effect when only the second demura module is turned on.

2. A display effect enhancement method comprising:

obtaining a grayscale value of each pixel of a picture to be displayed;

performing a first brightness compensation on the picture to be displayed according to the grayscale value of each pixel through a first demura module in a main control chip;

performing a second brightness compensation on the picture to be displayed that has been subjected to the first brightness compensation through a second demura module in a driving chip; and displaying the picture to be displayed that has been subjected to the second brightness compensation;

wherein performing a first brightness compensation on the picture to be displayed according to the grayscale value of each pixel comprises:

determining a target pixel and a non-target pixel in the picture to be displayed according to the grayscale value of each pixel and a preset rule;

performing brightness compensation on the target pixel based on a brightness compensation value corresponding to the target pixel, and performing brightness compensation on the non-target pixel based on a brightness compensation value corresponding to the non-target pixel, wherein the brightness compensation value corresponding to the target pixel is non-zero, and the brightness compensation value corresponding to the non-target pixel is 0; and determining the preset rule according to a first compensation effect when the first demura module and the second demura module are turned on at the same time and a second compensation effect when only the second demura module is turned on.

3. The display effect enhancement method according to claim 2, wherein determining the preset rule comprises:

using the second demura module to perform demura on a plurality of grayscale pictures or a picture comprising a plurality of grayscales so as to obtain a first demura image comprising the plurality of the grayscales;

using the first demura module to perform demura on the first demura image again so as to obtain a second demura image comprising the plurality of the grayscales; and determining with the preset rule that the pixel corresponding to the grayscale is the target pixel if a display effect of the second demura image is better than that of the first demura image under the same grayscale, otherwise, the pixel corresponding to the grayscale is the non-target pixel.

4. A display effect enhancement device, comprising a processor, a memory, and a display effect enhancement program stored on the memory and executable by the processor, wherein when the display effect enhancement program is executed by the processor, the steps of the display effect enhancement method are realized according to claim 3.

5. A display effect enhancement device, comprising a processor, a memory, and a display effect enhancement program stored on the memory and executable by the processor, wherein when the display effect enhancement program is executed by the processor, the steps of the display effect enhancement method are realized according to claim 2.

6. A display effect enhancement method comprising:

obtaining a grayscale value of each pixel of a picture to be displayed;

judging whether to turn on a first demura module according to the grayscale value of each pixel and a preset rule, and performing a brightness compensation on the picture to be displayed based on a judgment value, wherein the preset rule is determined according to a first compensation effect when the first demura module and a second demura module are turned on at the same time and a second compensation effect when only the second demura module is turned on, the first demura module is located in a main control chip, and the second demura module is located in a driving chip; and displaying the picture to be displayed that has been subjected to the brightness compensation.

7. The display effect enhancement method according to claim 6, wherein judging whether to turn on the first demura module according to the grayscale value of each pixel and the preset rule, and performing brightness compensation on the picture to be displayed based on the judgment value comprise:

determining a target pixel and a non-target pixel in the picture to be displayed according to the grayscale value of each pixel and the preset rule;

turning on the first demura module and the second demura module and performing a second brightness compensation on the target pixel; and turning off the first demura module, turning on the second demura module and performing a first brightness compensation on the non-target pixel.

8. The display effect enhancement method according to claim 7, wherein determining the preset rule comprise:

using the second demura module to perform demura on a plurality of grayscale pictures or a picture comprising a plurality of grayscales so as to obtain a first demura image comprising the plurality of the grayscales;

using the first demura module to perform demura on the first demura image again so as to obtain a second demura image comprising the plurality of the grayscales; and determining with the preset rule that the pixel corresponding to the grayscale is the target pixel if a display effect of the second demura image is better than that of the first demura image under the same grayscale, otherwise, the pixel corresponding to the grayscale is the non-target pixel.

9. A display effect enhancement device, comprising a processor, a memory, and a display effect enhancement program stored on the memory and executable by the processor, wherein when the display effect enhancement program is executed by the processor, the steps of the display effect enhancement method are realized according to claim 8.

10. A display effect enhancement device, comprising a processor, a memory, and a display effect enhancement program stored on the memory and executable by the processor, wherein when the display effect enhancement program is executed by the processor, the steps of the display effect enhancement method are realized according to claim 7.

11. A display effect enhancement device, comprising a processor, a memory, and a display effect enhancement program stored on the memory and executable by the processor, wherein when the display effect enhancement program is executed by the processor, the steps of the display effect enhancement method are realized according to claim 6.

* * * * *